Figure 1:
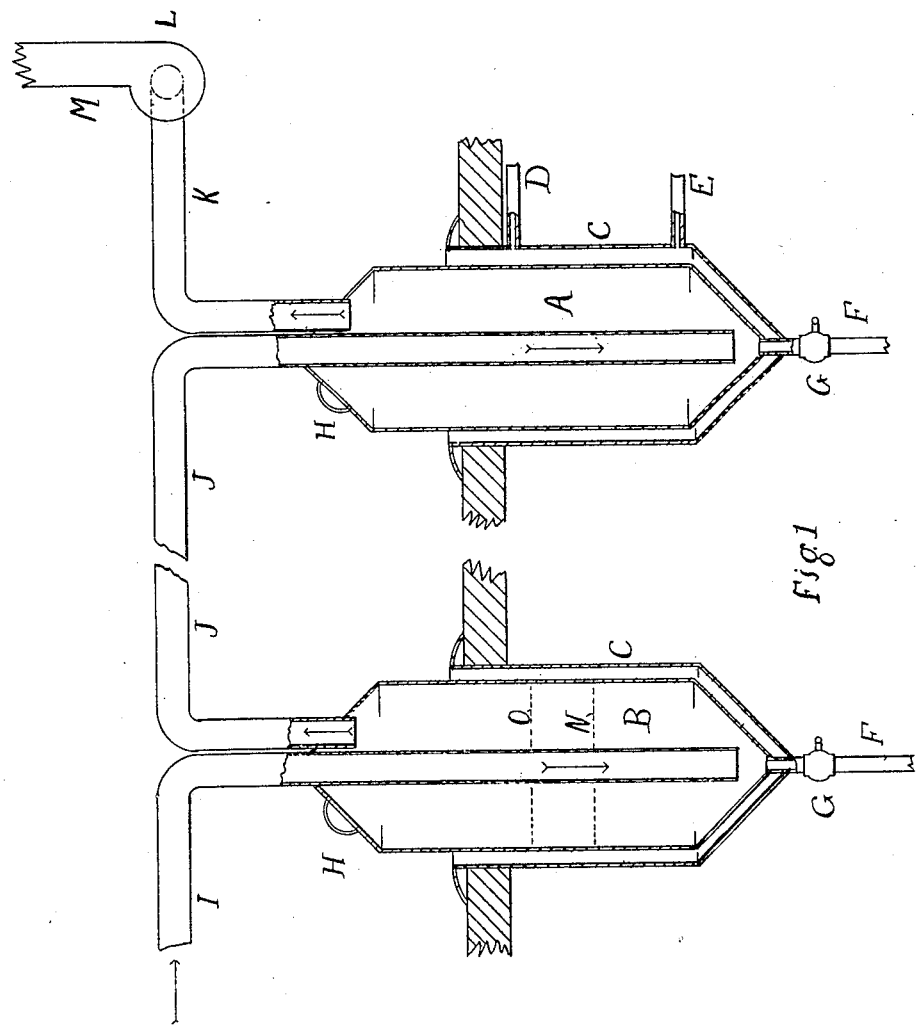

W. F. JENSEN.
METHOD OF PURIFYING MILK, CREAM, AND OTHER LIQUIDS.
APPLICATION FILED APR. 28, 1908.

906,532.

Patented Dec. 15, 1908.

2 SHEETS—SHEET 1.

Witnesses

Inventor

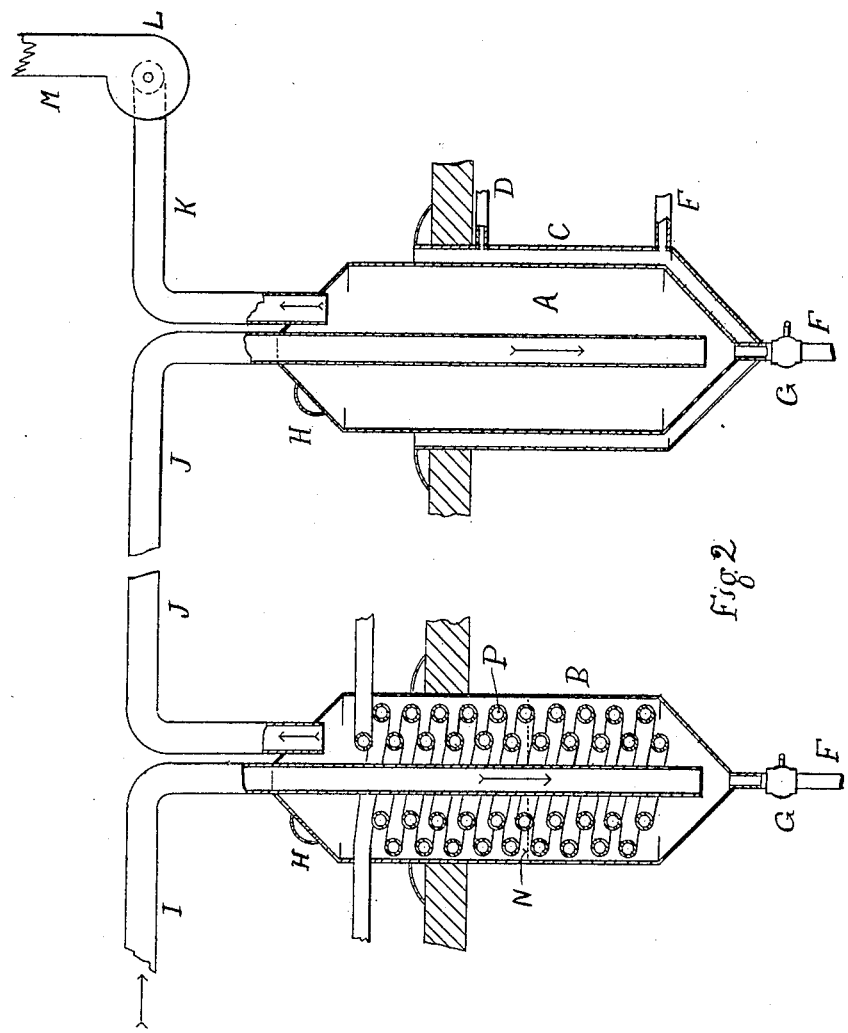

UNITED STATES PATENT OFFICE.

WIGGO F. JENSEN, OF TOPEKA, KANSAS.

METHOD OF PURIFYING MILK, CREAM, AND OTHER LIQUIDS.

No. 906,532.     Specification of Letters Patent.     Patented Dec. 15, 1908.

Application filed April 28, 1908. Serial No. 429,773.

*To all whom it may concern:*

Be it known that I, WIGGO F. JENSEN, a citizen of the United States, residing in Topeka, in the county of Shawnee and State of Kansas, have invented new and useful Improvements in the Methods of Purifying Milk, Cream, and other Liquids, of which the following is a specification.

My invention relates to the process of purifying milk, cream, and other liquids by subjecting same to certain changes of temperature to destroy the noxious germ life therein and to neutralize it.

In the treatment of milk and cream, the present method is to pasteurize and then cool the milk or cream. But in this process care must be taken that too high a temperature be not attained, as it might injure the nutritive and digestive qualities of the product, besides destroying the good flavor and thereby rendering the product unmarketable.

It is the object of my invention to provide a method for more thoroughly purifying milk, cream, and other liquids; also to provide a method for more thoroughly purifying the milk, cream, and other liquids and yet to keep within the range of temperatures known to be uninjurious to the liquid treated; to provide a simple and efficient method of purifying milk, cream, and other liquids, by simple apparatus, and without the use of the mechanical pasteurizers and coolers now in common use; also to provide a simple and efficient method of purifying milk, cream, and other liquids by introducing a new purifying agent, namely a vacuum, or a highly rarefied state of the air, in which the liquid is undergoing treatment, and at the same time to utilize a blast of the rarefied air for agitating the liquid, thus bringing all particles of the liquid in contact with the air; also to provide a simple and efficient method of purifying milk, cream, and other liquids, by a vacuum treatment, or a rarefied air treatment, in which the liquid undergoing treatment is subjected to a blast of the rarefied air, the rarefied air being drawn through a purifying agent, as water, the water being used also as an agent for varying and regulating the degree of rarefaction and the temperature of the air; also to provide a method of treatment by rarefied air in which the temperature of the liquid may be varied and regulated by the temperature of the air by subjecting the liquid to a blast of the rarefied air; also to provide a simple and efficient method not only of purifying the cream or milk for domestic or table use, but also preparatory to making butter; and also to provide a simple and efficient method of purifying the milk or cream and also of retaining the purity thereof during the entire process of making butter by subjecting the product at the several stages, and at all the stages, to rarefied air and to a blast of rarefied air.

In subjecting the liquid under treatment to a high vacuum, I work under the theory that the noxious germs live only in favorable conditions, and by subjecting the liquid to a continuous vacuum, or to a highly rarefied condition of the air, an abnormal condition is created which is destructive of the germ life; and by carrying the vacuum treatment through the several stages of temperature variations, the purifying becomes more thorough; at the same time, I am enabled by the same means which produces the rarefied air to subject the liquid to an air blast to agitate the liquid and bring every particle in contact with the rarefied air; also, instead of employing the mechanical pasteurizers and coolers heretofore in general use, I provide a means for varying and regulating the temperature by varying and regulating the temperature of the incoming rarefied air; also by the same means which I employ for producing the rarefaction, I am enabled to draw the incoming air through a purifying agent, as water, and thus subject the liquid to a blast of purified and rarefied air, and thus accomplishing the aeration by greatly less air (quantitatively considered) than where the liquid is subject to an air blast under pressure. Not only therefore is the incoming air itself purified, but by being highly expanded, the opportunity of infection therefrom is greatly lessened. Further, by drawing the incoming air through the water, I am enabled by varying and regulating the temperature of the water to vary and regulate the temperature of the air, and thereby to vary and regulate the temperature of the liquid under treatment.

In the drawings accompanying and forming part of this specification, and in the description thereof, I have shown, largely in diagram, preferred forms of apparatus used in working my invention, and the best mode of applying the principles thereof; but it is to be understood that I do not limit myself to the working of my invention by the apparatus shown or described, that the steps or parts herein separately claimed may be used alone, or with other steps in processes of like general nature, and that, within the scope of the appended claims, I contemplate changes in form, proportions, materials, the transposition of parts and steps, and the substitution of equivalent members and steps, without departing from the spirit of the invention.

Figure 1 represents an apparatus by which the principles of my invention may be applied to the purification of milk, cream, and other liquids, especially to the purification of milk or cream preparatory to churning, or to prepare the same for domestic consumption, also to the complete process of making butter, and also to several of the stages in the process of making butter. Fig. 2 is a similar apparatus, the difference being that in the water tank I provide a series of coils for varying and regulating the temperature of the water therein, and for drying the air as it passes up out of the water.

Similar reference characters indicate like or corresponding parts throughout the several views.

A and B represent two inclosed air-tight liquid tanks, A being the tank in which the liquid is treated, and B a tank containing water or other suitable purifying agent. Each tank may be surrounded by a water jacket C provided with inlet and outlet pipes D, E whereby any desired degree of temperature may be maintained in the jacket and imparted to the contents of the tank; but it will be seen hereinafter that this water jacket is not an absolute necessity for either tank, though a desirable feature of the tank A.

F is an outlet pipe leading from the bottom of each tank and provided with a cut-off cock G. Each tank may be provided with an inspection port H, which is normally closed. An air pipe I leads from any suitable air supply, as from out of doors, to the bottom of the tank B; an air-pipe J leads from the top of the tank B to the bottom of the tank A; and an air-pipe leads from the top of tank A to a suction blower L, from which leads a discharge air-pipe M.

N and O indicate several levels of the water in the tank B, to show how the air pressure in the tank A may be varied.

To illustrate the working of my invention, I instance the purifying first of milk or cream, and then the complete process of making butter under the favorable purifying agencies involved in my invention.

I place the desired quantity of the milk or cream, as it comes in a miscellaneous mixture to the commercial creamery or milk distributing depot, in the tank A, and a sufficient quantity of pure water in the tank B to bring the level to a height sufficient to produce the desired degree of rarefaction; the suction blower is set in operation, the effect of which is to rarefy the air in the tank A, whereupon the atmospheric pressure causes the air in pipe J to be forced through the lower end of the pipe in tank A where it rises through the liquid therein; the rarefaction of the air in pipe J and tank B, in turn, causes the atmospheric pressure to force a blast of air from the lower end of pipe I up through the water in the tank B. Obviously the degree of rarefaction will depend largely upon the height of the liquid levels in the tanks above the respective air-intake pipes; and while some rarefaction will result from the liquid in tank A, the rarefaction may be greatly enhanced by raising the water level in tank B. Obviously too, the tank B might be dispensed with, the air for pipe J being direct from the atmosphere, from off of coils, or from a room or rooms, wherein it may have been treated, or its temperature regulated.

To regulate the temperature of the liquid undergoing treatment, I prefer to vary or regulate the temperature of the water in tank B; and this varying and regulating of the temperature of that water, I prefer to do by means of the coils P set in the water, as shown in Fig. 2. Also by arranging the coils so that they extend above the water level, the air, in passing from the water to the pipe J, comes in contact with the coils, and is dried. Thus, by any suitable means, I subject the air which is drawn into the tank A to a temperature which will raise the temperature of the liquid in tank A to from 150 to 210 degrees Fahrenheit; and the blower is kept in operation for the desired length of time to give the milk or cream thorough pasteurization. Then by changing the temperature of the air passing through pipe J, the temperature of the milk or cream is reduced to from 40 to 70 degrees, the blower being kept in continuous operation, producing at both stages a continuous rarefied condition of the air.

I claim for the process to this point a more thorough purification of milk and cream than has heretofore been accomplished in a commercial way, and also I claim that the more thorough purification can, by this process, be effected by simpler and more efficient means. The milk or cream at this stage is ready for the market for domestic consumption; or the cream may be further treated by the same general system of aeration by rarefied air. Thus, the noxious germs having been destroyed (more completely than by any method heretofore followed in commercial butter-making), a pure culture germ is added as a starter, and it is left standing at about 52 degrees for from two to twenty-four hours, or until ripened to a proper degree, when it is churned. The churning may be in any suitable device, as in a rotary churn, or by agitation by an air-blast in the tank A, or by additional mechanical means in the tank; but in any method of the churning, I prefer to follow my improved system of subjecting the product during the churning to rarefied air, and to a blast of rarefied air, in order to minimize the danger of infection. When the butter has formed, the butter-milk may be drawn off, and water may be added for washing, and the washing done by aeration in the presence of rarefied air, as before, that is, by operation of the blower while the butter and washing water are in the tank A.

What I claim is:

1. The method of pasteurizing cream, milk, and other liquids, which consists in subjecting same to an air blast in the presence of rarefied air.

2. The method of treating cream, milk, and other liquids, which consists in subjecting same to an air blast in the presence of rarefied air and regulating the temperature of the liquid under treatment by the air blast.

3. The method of treating cream, milk, and other liquids, by subjecting same to an air blast in the presence of rarefied air, regulating the temperature of the liquid under treatment by the temperature of the air blast, drawing the air for the air blast through water, and regulating the temperature of the air blast by the temperature of the water through which the air for the air blast is drawn.

4. The method of treating cream, milk, and other liquids, by subjecting same to an air blast in the presence of rarefied air, drawing said air through a reservoir of water, regulating the temperature of the liquid under treatment by the air and regulating the temperature of the air by the temperature of the water, and also regulating the degree of rarefaction of the air by regulating the level of the water in the reservoir.

5. The method of treating cream consisting of subjecting it to an air blast in the presence of rarefied air, at a temperature of from 150 to 210 degrees Fahrenheit, then subjecting it to an air blast in the presence of rarefied air at a temperature of from 40 to 70 degrees, then adding the pure culture germ and ripening the cream, and then churning the product by an air blast in the presence of rarefied air, then drawing off the butter-milk, then adding water and subjecting same to an air blast in the presence of rarefied air; and regulating the degree of rarefaction by the water level in a water reservoir through which the air supply is drawn.

6. The method of treating cream, milk, and other liquids, consisting of placing same in an air-tight tank, exhausting the air therefrom and at the same time introducing air thereinto through the liquid, drawing said air supply from the top of an air-tight tank containing water and into which air is introduced through the water, regulating the temperature of the liquid undergoing treatment by the temperature of the air supplied therethrough, and regulating the degree of rarefaction of the air by varying the level of the water in the water tank.

In testimony whereof I have hereunto set my hand in the presence of witnesses.

WIGGO F. JENSEN.

Witnesses:
  W. H. JENKINS,
  ED. G. SMITH.